Oct. 6, 1970 A. R. WILLIAMS 3,531,854
METHOD OF WELDING A LAMINATE
Original Filed June 29, 1967 2 Sheets-Sheet 1
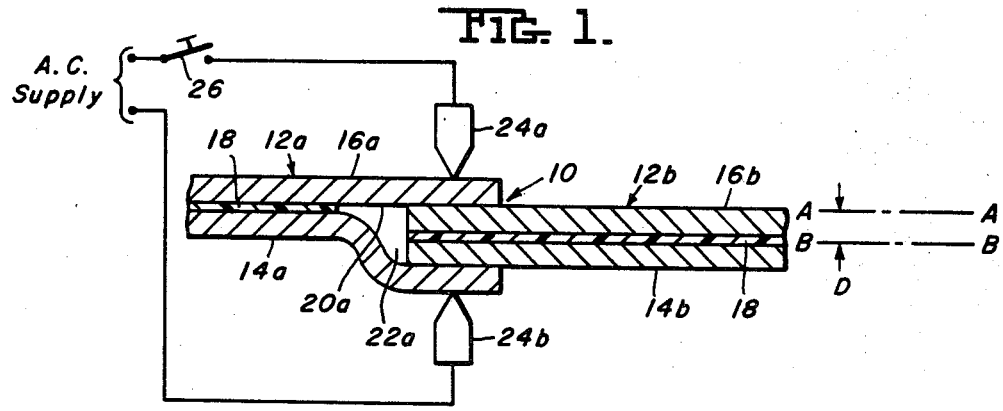
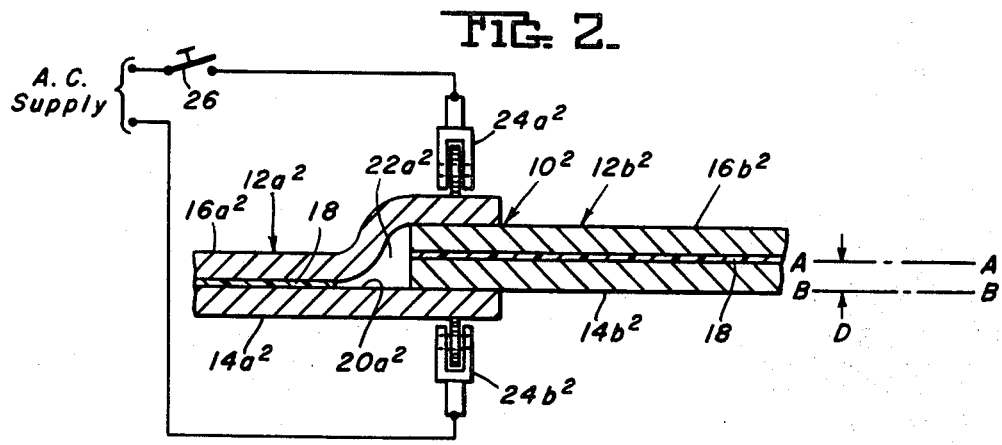
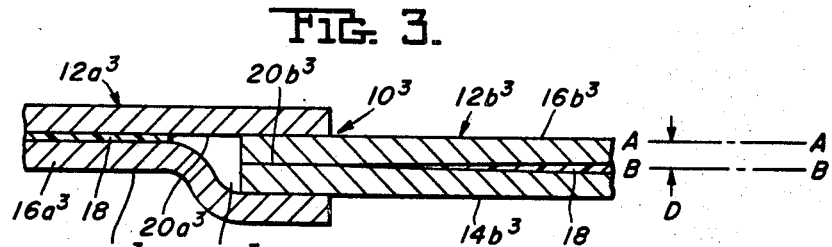
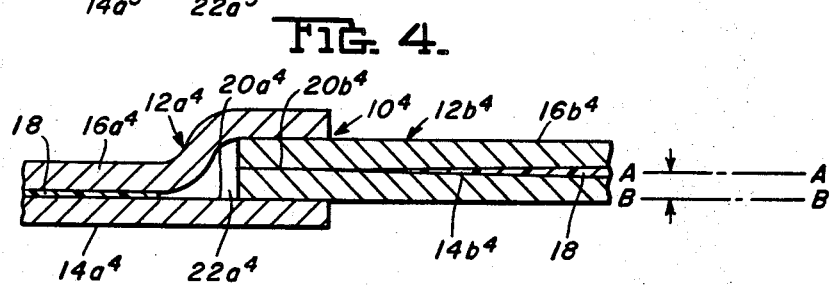
INVENTOR.
ALVIN R. WILLIAMS
By Robert J. Seeb, J.
Attorney

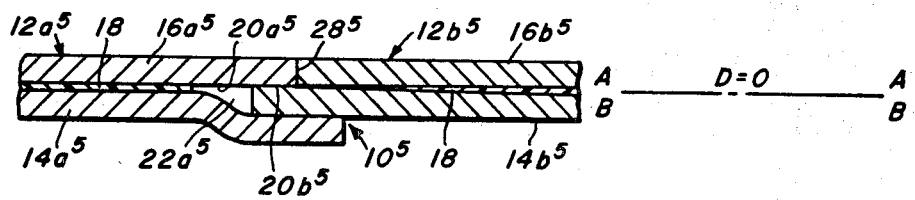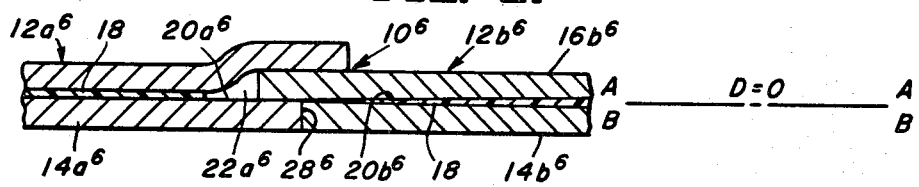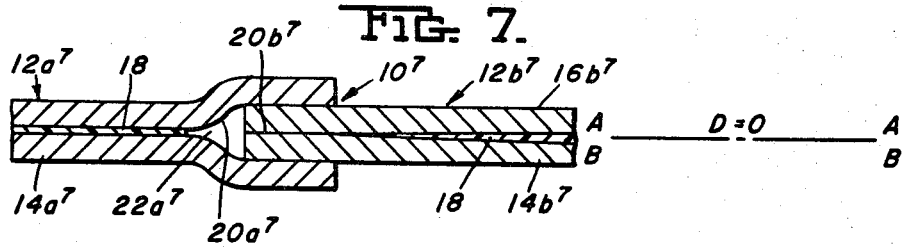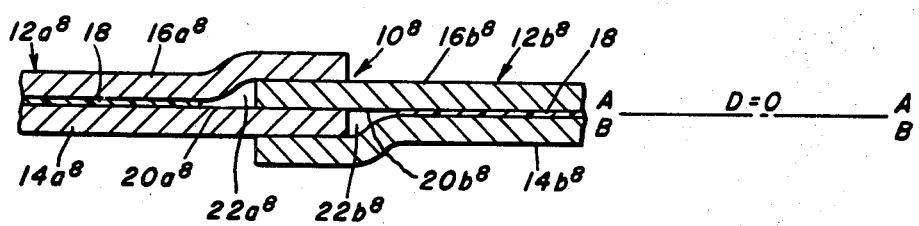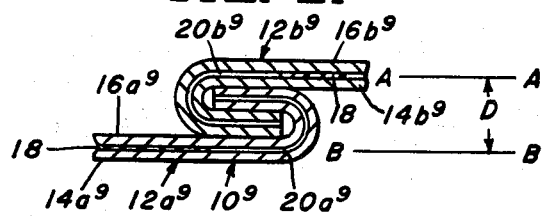

United States Patent Office 3,531,854
Patented Oct. 6, 1970

3,531,854
METHOD OF WELDING A LAMINATE
Alvin R. Williams, Northfield, Ohio, assignor to United States Steel Corporation, a corporation of Delaware
Original application June 29, 1967, Ser. No. 650,042, now Patent No. 3,489,446, dated Jan. 13, 1970. Divided and this application Aug. 5, 1969, Ser. No. 847,662
Int. Cl. B23k 1/20, 31/02
U.S. Cl. 29—483
8 Claims

ABSTRACT OF THE DISCLOSURE

This invention relates to a method of welding a first adhesively bonded laminate to a second adhesively bonded laminate. The method forms a welded joint between, for example, a first portion and a second portion of one adhesively bonded laminate and is adapted to provide a noble metal protective surface on a predetermined side of the laminate.

This application is a division of United States patent application Ser. No. 650,042 filed June 29, 1967, now Pat. No. 3,489,446, by applicant.

BACKGROUND OF THE INVENTION

In the manufacture of drums, vats and the like and, in particular, in the welding of adhesively clad sheets, particularly stainless and carbon steel for such products, it is advantageous to have the stainless steel continuous over the entire inner surface of the product, a feat difficult to achieve at the seam or joint of the product. The joint or seam is usually spot welded or continuously seam welded. If dissimilar metals are adjacent each other in the weld area of the joint welding, difficulties are encountered because of the different electrical and heat conductivity of the dissimilar materials.

Conventional methods of and apparatus for welding similar products are of the type shown in the following United States patents:

675,357, Maeconochie, May 28, 1901
706,635, Booth, Aug. 12, 1902
1,495,653, Thomas et al., May 27, 1924
1,161,164, Sexton, Nov. 23, 1915
2,050,326, Hopkins, Sept. 11, 1936
2,120,461, Capeman, June 14, 1938
2,181,319, Flugge, Nov. 28, 1939
2,187,740, Hothersall, Jan. 23, 1940
2,198,630, McManus, Apr. 30, 1940
2,214,422, Kronquest, Sept. 10, 1940
2,231,407, Castor et al., Feb. 11, 1941
2,250,617, Argentin, July 29, 1941
2,326,815, Wobbe, Aug. 17, 1943
2,343,255, Pray et al., Feb. 29, 1944
2,354,855, Emanuel, Aug. 1, 1944
2,359,775, McManus et al., Oct. 10, 1944
2,426,820, Evans, Sept. 2, 1947
2,641,674, Arr et al., June 9, 1953
2,797,843, Orlins, July 2, 1957
3,019,753, Orlins, Feb. 6, 1962

OBJECTS OF THE INVENTION

It is the general object of this invention to avoid and overcome the foregoing and other difficulties of and objections to prior art practices by the provision of an improved method of welding together adhesively bonded laminates to provide a seam where like metals only are in contact with each other.

BRIEF SUMMARY OF THE INVENTION

The aforesaid objects of this invention, and other objects which will become apparent as the description proceeds, are achieved by providing a method of welding together adhesively bonded laminates to provide a seam or joint where like metals only are in contact.

The method of forming a welded joint between a first portion and a second portion of an adhesively bonded laminate is adapted to provide a noble metal protective surface on a predetermined side of the laminate. The first portion and the second portion have a noble metal member, a base metal member and an electrically insulating adhesive between the noble metal member and the base metal member. The method includes the steps of providing the first portion with an adhesive free first marginal portion, forming one of the noble metal member and base metal member in the first marginal portion to provide a first cavity between the one and the other of the noble member and the base metal member in the first marginal portion, disposing the second portion in the first cavity so that the noble metal member of the first portion is adjacent the noble metal member of the second portion, and welding the first portion to the second portion adjacent the first marginal portion.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIG. 1 is a diagrammatic side elevational view of the joint of the invention for a drum, vat or the like prior to welding and showing the first portion of the laminate having an adhesive free marginal portion, the noble metal members of both portions of the laminate on the inner surface, the noble metal member of the first portion formed to provide a cavity, the second portion of the laminate disposed in the cavity, and a pair of lap welding electrodes;

FIG. 2 is a view similar to FIG. 1 showing the noble metal members of both portions of the laminate on the inner surface, the base metal member of the first portion of the laminate, the second portion of the laminate disposed in the cavity formed to provide a cavity, and movable welding electrodes for a continuous seam weld;

FIG. 3 is a view similar to FIGS. 1, 2 with the electrodes removed for clarity and showing the second portion of the laminate also having an adhesive free marginal portion, the noble metal members of both portions of the laminate on the inner surface, the noble metal member of the first portion of the laminate and the second portion of the laminate formed to provide a cavity disposed in the cavity and welded to the first portion;

FIG. 4 is a view similar to FIG. 3 showing the noble metal members of both portions of the laminate on the inner surface, the base metal member of the first portion of the laminate formed to provide the cavity, adhesive free marginal portions on the first portion and the second portion of the laminate and the second portion of the laminate disposed in the cavity and welded to the first portion;

FIG. 5 is a view similar to FIGS. 3, 4 showing the noble metal members of both portions of the laminate on the inner surface, both portions of the laminate provided with an adhesive free marginal portion, the noble metal member of the first portion of the laminate formed to provide a cavity and the base metal member of the second portion cut away to permit butt welding of the adjacent base metal members;

FIG. 6 is a view similar to FIGS. 3–5 showing both portions of the laminate provided with adhesive free marginal portions, the base metal member of the first portion of the laminate formed to provide cavity, the noble metal member of the second portion cut away and the adjacent noble metal members butt welded together on the inner surface;

FIG. 7 is a view similar to FIGS. 3–6 showing the noble metal members of both portions of the laminate on the inner surface, both portions of the laminate having an adhesive free marginal portion, a noble metal member and a base metal member of the first portion of the laminate formed to provide a cavity and the second portion of the laminate disposed in the cavity and welded to the first portion;

FIG. 8 is a view similar to FIGS. 3–7 showing the noble metal members of both portions of the laminate on the inner surface, the base metal member of the first portion of the laminate formed to provide a first cavity, a noble metal member of the second portion of the laminate formed to provide a second cavity and the two portions of the laminate welded in an interlocking arrangement; and FIG. 9 is a view similar to FIGS. 1–8 showing two laminates positioned for a seam weld.

Although the principles of this invention are broadly applicable to welding, this invention is particularly adapted for use in conjunction with a welded joint or seam for a drum, vat or the like between two portions of an adhesively bonded laminate or between two bonded laminates and hence it has been so illustrated and will be so described.

DETAILED DESCRIPTION

With specific reference to the form of this invention illustrated in the drawings, and referring particularly to FIG. 1, a joint to be welded for a drum, vat or the like is indicated generally by the reference numeral 10.

This joint 10 is between a first portion 12a and a second portion 12b of an adhesively bonded laminate and such joint 10 is adapted to provide a noble metal protective surface on a predetermined side of the laminate, in this case, as viewed in FIG. 1, the inner or bottom side of such drum, vat or the like. This first portion 12a and second portion 12b have noble metal members 14a, 14b respectively (suitably stainless steel or the like), base metal members 16a, 16b (suitably carbon steel or the like) and a substantially electrically insulating adhesive 18 disposed between the noble metal members 14a, 14b and the base metal members 16a, 16b. A suitable adhesive 18 is CYBOND 4000 adhesive, the trade name of American Cyanamid Laboratories for a polyurethane adhesive.

It will be understood that any other laminate, such as stainless steel or galvanized steel, aluminum on steel, copper on aluminum, bronze on galvanized steel, stainless steel on lead or the like may be employed. Further other adhesives, such as the following may be employed:

Trademark or trade name and manufacturer:
 "Surlyn," a ionomer resin, E. I. duPont de Nemours & Co.
 "Bakelite," phenoxy resins PKHH and PAJH, Union Carbide Corporation
 "Scotch-Weld" brand structural adhesives, 3M Company
 A–1103–B adhesive, B. F. Goodrich Industrial Products Company
 USS "Nexus" PQE–1 polymeric material, United States Steel Corporation.

The first portion 12a is provided with an adhesive free first marginal portion 20a. One of the noble metal member 14a and the base metal member 16a in the first marginal portion 20a (in this case the stainless steel 14a) is formed or bent outwardly from the longitudinal axis A—A of the first portion 12a to provide a first cavity 22a between the stainless steel 14a and other of the stainless steel 14a and the carbon steel 16a (in this case the carbon steel 16a). The left-hand end of the second portion 12b, as viewed in FIG. 1, is disposed in the first cavity 22a so that the stainless steel 16b of the second portion 12b is adjacent the stainless steel 16a of the first portion 12a and with the longitudinal axis B—B of the second portion 12b disposed a distance D from the longitudinal axis A—A of the first portion 12a.

The first portion 12a is welded to the second portion 12b adjacent the first marginal portion 20a by lap welding type electrodes 24a, 24b connected through a switch 26 to a suitable supply indicated by the legend "AC Supply." The welding current flows from electrode 24a to electrode 24b until the adhesive 18 in the left-hand end of the second portion 12b (FIG. 1) reaches its softening temperature, whereupon the electrodes 24a, 24b compress the carbon steel 16b against the stainless steel 14b and welding current rapidly flows across the second portion 12b to weld the first portion 12a to the second portion 12b.

ALTERNATIVE EMBODIMENTS

It will be understood by those skilled in the art that alternatively, as shown in FIG. 2, the joint $10^2$ to be welded may be a continuous seam, the base metal member $16a^2$ of the first portion $12a^2$ is formed to provide the first cavity $22a^2$ and the wheel type electrodes $24a^2$, $24b^2$ are employed.

In the welded joint $10^3$ of FIG. 3 the second portion $12b^3$ is provided with an adhesive free second marginal portion $20b^3$ to increase welding speed and, as in FIG. 1, the stainless steel $14a^3$ of the first portion $12a^3$ is formed to provide the first cavity $22a^3$.

Referring to the welded joint $10^4$ of FIG. 4, the first marginal portion $20a^4$ and the second marginal portion $20b^4$ are used. The carbon steel $16a^4$ of the first portion $12a^4$ is formed to provide the first cavity $22a^4$.

In order to provide substantially coinciding longitudinal axes for the welded portions of the first portion 12a and the second portion 12b in the welded joint $10^5$ of FIG. 5, one of the stainless steel $14b^5$ and the carbon steel $16b^5$ of the second portion $12b^5$ (in this case the carbon steel $16b^5$) is cut away at $28^5$ so that it can be butt welded to the carbon steel $16a^5$ of the first portion $12a^5$.

In FIG. 6 the stainless steel $14b^6$ of the second portion $12b^6$ is cut away at $28^6$ so that it can be butt welded to the stainless steel $14a^6$ of the first portion $12a^6$. It will be understood that the cut away member may be in either the first portion $12a^5$, $12a^6$ or in the second portion $12b^5$, $12b^6$.

As shown in FIG. 7 both the carbon steel $16a^7$ and stainless steel $14a^7$ of the first portion $12a^7$ are formed or bent symmetrically to define the first cavity $22a^7$.

Referring now to the interlocking welded joint $10^8$ shown in FIG. 8, the carbon steel $16a^8$ of the first portion $12a^8$ is formed to provide the first cavity $22a^8$ and the stainless steel $14b^8$ of the second portion $12b^8$ is bent to define the second cavity $22b^8$.

In FIG. 9, both the first portion $12a^9$ and the second portion $12b^9$ in the joint $10^9$ to be welded have adhesive free marginal portions $20a^9$, $20b^9$ respectively and are arranged for a seam weld with the stainless steel members 14a, 14b on the inside surface.

METHOD

It will be understood from the above description that a method is provided for forming a weld joint 10, $10^2$ etc. between a first portion 12a, $12a^2$ etc. and a second portion 12b, $12b^2$ etc. of an adhesively bonded laminate adapted to provide a noble metal protective surface on a predetermined side (i.e. the inner side) of the laminate. This method includes the steps of:

(a) providing the first portion 12a, $12a^2$ etc. (FIGS.

1-9) with an adhesive free first marginal portion $20a$, $20a^2$;

(b) forming one of the noble metal members $14a$, $14a^2$ etc. (FIGS. 1–9) and the base metal member $16a$, $16a^2$ etc. in the first marginal portion $20a$, $20a^2$ etc. to provide a first cavity $22a$, $22a^2$ etc. between the one and the other of the noble member $14a$, $14a^2$ etc. and the base metal member $16a$, $16a^2$ etc., in the first marginal portion $20a$, $20a^2$ etc.;

(c) disposing the second portion $12b$, $12b^2$ etc. (FIGS. 1–4, 7) in the first cavity $22a$, $22a^2$ etc. so that the noble metal member $14a$, $14a^2$ etc. of the first portion $12a$, $12a^2$ etc. is adjacent the noble metal member $14a$, $14a^2$ etc. of the second portion $12b$, $12b^2$; and (d) welding the first portion $12a$, $12a^2$ etc. (FIGS. 1–9) to the second portion $12b$, $12b^2$ etc. adjacent the first marginal portion $20a$, $20a^2$ etc.

Included also are the steps of:

(a) providing the second portion $12b^3$, $12b^4$ etc. (FIGS. 3–9) with an adhesive free second marginal portion $20b^3$, $20b^4$ etc.;

(b) offsetting the first cavity $20a$, $20a^2$ etc. (FIGS. 1–4) from the longitudinal axis of the one of the noble metal $14a$, $14a^2$ etc. and the base metal member $16a$, $16a^2$ etc. in the first marginal portion $20a$, $20a^2$ so that the longitudinal axis A—A of the first portion $12a$, $12a^2$ etc. is offset from the longitudinal axis B—B of the second portion $12b$, $12b^2$;

(c) cutting away one of the noble metal member $14a^5$, $14a^6$ (FIGS. 5, 6) and the base metal member $16a^5$, $16a^6$ in the first marginal portion $20a^5$, $20a^6$ or the second marginal portions so that it can be butt welded to its corresponding metal member of the other portion (i.e. in this case the second portion $12b^5$, $12b^6$) and the longitudinal axis A—A of the first portion $12a^5$, $12a^6$ substantially coincides with the longitudinal axis B—B of the second portion $12b^5$, $12b^6$;

(a) forming the noble metal member $14a^7$ (FIG. 7) and the base metal member $16a^7$ in the first marginal portion $20a^7$ to provide the first cavity $20a^7$ so that the longitudinal axis A—A of the first portion $12a^7$ substantially coincides with the longitudinal axis B—B of the second portion $12b^7$;

(e) forming one of the noble metal member $14a^8$ (FIG. 8) and the base metal member $16a^8$ in the second marginal portion $20b^8$ to provide a second cavity $22b^8$;

(f) disposing the first cavity $20a^8$ (FIG. 8) and the second cavity $22a^8$ adjacent each other so that the noble metal member $16a^8$ of the first portion $12a^8$ is adjacent the noble metal member $16a^8$ of the second portion $12b^8$; and (g) forming a seam weld between the first portion $12a^9$ and the second portion $12b^9$.

SUMMARY OF THE ACHIEVEMENT OF THE OBJECTS OF THE INVENTION

It will be recognized by those skilled in the art that the objects of this invention have been achieved by providing an improved method of welding together adhesively bonded laminates to provide a seam where like metals only are in contact with each other.

While in accordance with the patent statutes preferred and alternative embodiments of this invention have been illustrated and described in detail, it is to be particularly understood that the invention is not limited thereto or thereby.

I claim:

1. A method of forming a welded joint between a first portion and a second portion of an adhesively bonded laminate adapted to provide a noble metal protective surface on a predetermined side of said laminate, said first portion and said second portion each having a noble metal member, a base metal member and an electrically insulating adhesive between said noble metal member and said base metal member, said method including the steps of:

(a) providing said first portion with an adhesive free first marginal portion;

(b) forming either said noble metal member or said base metal member at said first marginal portion to provide a first cavity between said noble metal member and said base metal member;

(c) disposing said second portion in said first cavity so that said noble metal member of said first portion is adjacent said noble metal member of said second portion; and (d) welding said first portion to said second portion adjacent said first marginal portion.

2. The method recited in claim 1 including the step of:

(a) providing said second portion with an adhesive free second marginal portion.

3. The method recited in claim 1 including the step of:

(a) offsetting said first cavity from the longitudinal axis of said one of said noble metal member and said base metal member in said first marginal portion so that the longitudinal axis of said first portion is offset from the longitudinal axis of said second portion.

4. The method recited in claim 2 including the step of:

(a) cutting away either the noble metal member or the base metal member in either the said first marginal portion or said second marginal portion so that it can be butt welded to its corresponding metal member of the other of the first marginal portion and the second marginal portion and the longitudinal axis of said first portion substantially coincides with the longitudinal axis of said second portion.

5. The method recited in claim 1 including the step of:

(a) forming said noble metal member and said base metal member in said first marginal portion to provide said first cavity so that the longitudinal axis of said first portion substantially coincides with the longitudinal axis of said second portion.

6. The method recited in claim 2 including the step of:

(a) forming said noble metal member and said base metal member in said first marginal portion to provide said first cavity so that the longitudinal axis of said first portion substantially coincides with the longitudinal axis of said second portion.

7. The method recited in claim 2 including the step of:

(a) forming either the noble metal member or said base metal member in said second marginal portion to provide a second cavity; and (b) disposing said first cavity and said second cavity adjacent each other so that said noble metal member of said first portion is adjacent said noble metal member of said second portion.

8. The method recited in claim 2 including the step of:

(a) seam welding said first portion to said second portion.

References Cited

UNITED STATES PATENTS

| 2,527,479 | 10/1950 | Hall | 219—91 XR |
| 2,641,674 | 6/1953 | Orr et al. | 219—91 |
| 2,996,600 | 8/1961 | Gardner et al. | 29—483 XR |
| 3,277,268 | 10/1966 | Williams et al. | 219—91 XR |
| 3,406,444 | 10/1968 | Parker et al. | 29—483 XR |

JOHN F. CAMPBELL, Primary Examiner

R. B. LAZARUS, Assistant Examiner

U.S. Cl. X.R.

29—475, 482; 287—189.365

UNITED STATES PATENT OFFICE
CERTIFICATE OF CORRECTION

Patent No. 3,531,854          Dated October 6, 1970

Inventor(s) Alvin R. Williams

It is certified that error appears in the above-identified patent and that said Letters Patent are hereby corrected as shown below:

Column 1, line 60, "Arr" should read -- Orr --. Column 3, line 55, "or" should read -- on --. Column 5, line 23, after "metal" insert -- member --; line 38, "(a)" should read -- (d) --.

Signed and sealed this 13th day of April 1971.

(SEAL)
Attest:

EDWARD M. FLETCHER, JR.
Attesting Officer

WILLIAM E. SCHUYLER, JR.
Commissioner of Patents